Figure 3:
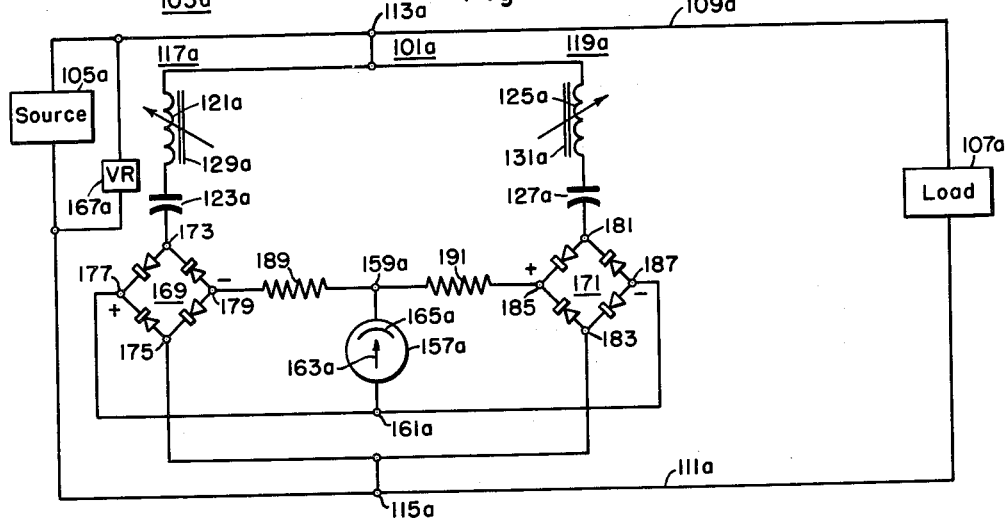

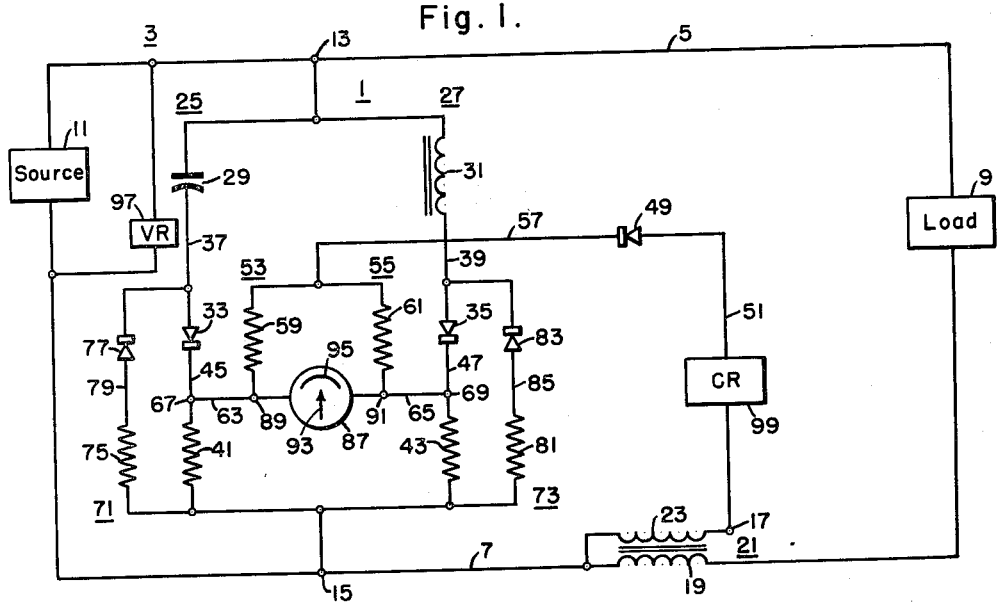

July 18, 1961  U. L. SMITH  2,993,170
ALTERNATING CURRENT RESPONSIVE DEVICES
Filed June 29, 1955  2 Sheets-Sheet 2

United States Patent Office 2,993,170
Patented July 18, 1961

1

2,993,170
ALTERNATING CURRENT RESPONSIVE DEVICES
Uel L. Smith, Morristown, N.J., assignor to Westinghouse Electric Corporation, East Pittsburgh, Pa., a corporation of Pennsylvania
Filed June 29, 1955, Ser. No. 518,900
4 Claims. (Cl. 324—81)

This invention relates to alternating current responsive devices and has particular relation to alternating current responsive devices for providing an indication of variable characteristics of alternating quantities.

Devices have previously been provided for producing a responsive representative of variable characteristics of alternating quantities present in associated circuits. For example, devices have been provided to produce a response representative of the frequency of an energizing alternating quantity. As a further example, devices have been provided for producing a response representative of the phase relationship between two energizing alternating quantities.

According to the present invention, a device is provided which includes a static network energizable by alternating quantities with a direct current responsive translating device connected for energization from the network by a resultant quantity to provide an indication of variable characteristics of the energizing quantities. The translating device may conveniently be in the form of a conventional permanent magnet moving coil instrument having a suitably calibrated scale across which an indicating pointer is adapted to move. If desired, the instrument may be of the recording type to provide a permanent record of such characteristics.

In accordance with one aspect of the invention, a device is provided which includes a static network energizable by two alternating quantities with a direct current instrument connected for energization from the network by a resultant direct quantity to produce an indication of the phase relationship between the energizing alternating quantities. The direct current instrument may be in the form of either an indicating or a recording instrument.

According to a preferred embodiment of the invention, the static network includes a pair of circuits arranged for parallel energization from a first alternating quantity so that each circuit carries a separate component of the first alternating quantity. Each of the circuits includes reactive impedance means proportioned to establish substantially equal leading and lagging phase displacements of the components relative to the first alternating quantity. Suitable rectifier means are included in each circuit to provide a pair of first direct current quantities from the associated components.

The static network further includes means for deriving a pair of second direct current quantities from a second alternating quantity energizing the network. A pair of resistance elements of substantially equal resistance are connected for energization by the first and second direct current quantities to produce two resultant direct voltage quantities. The instrument is connected for differential energization from the voltage quantities by a resultant direct current quantity to produce a response representative of the phase relationship between the alternating quantities.

According to a further aspect of the invention, a device is provided which includes a static network arranged for energization by an alternating quantity with a direct current instrument connected for energization from the network to provide an indication of the frequency of the energizing quantity. The static network includes a pair of differently tuned resonant circuits arranged for parallel

2 energization in accordance with the energizing quantity to carry a separate component of the energizing quantity. Each of the circuits includes suitable rectifier means for providing a pair of direct quantities whose difference is a function of the frequency of the energizing quantity. A suitable direct current instrument is connected for differential energization from the resultant quantities to produce a response representative of frequency of the energizing quantity.

It is therefore an object of the invention to provide an improved alternating current responsive device.

It is another object of the invention to provide an improved device for producing an indication of the phase relationship between two energizing alternating quantities.

It is a further object of the invention to provide a device which includes a direct current instrument for producing an indication of the phase relationship between two alternating quantities energizing the device.

It is a still further object of the invention to provide a device including a static network energizable by two alternating quantities with a direct current instrument connected for energization from the network to provide an indication of the phase relationship between the alternating quantities.

It is another object of the invention to provide an improved device for producing an indication of the frequency of an alternative quantity.

It is a further object of the invention to provide a device including a direct current instrument for producing an indication of the frequency of an alternating quantity energizing the device.

It is still another object of the invention to provide a device which includes a static network energizable by an alternating quantity with a direct current instrument connected for energization from the network to provide an indication of the frequency of the alternating quantity.

Figure 4:
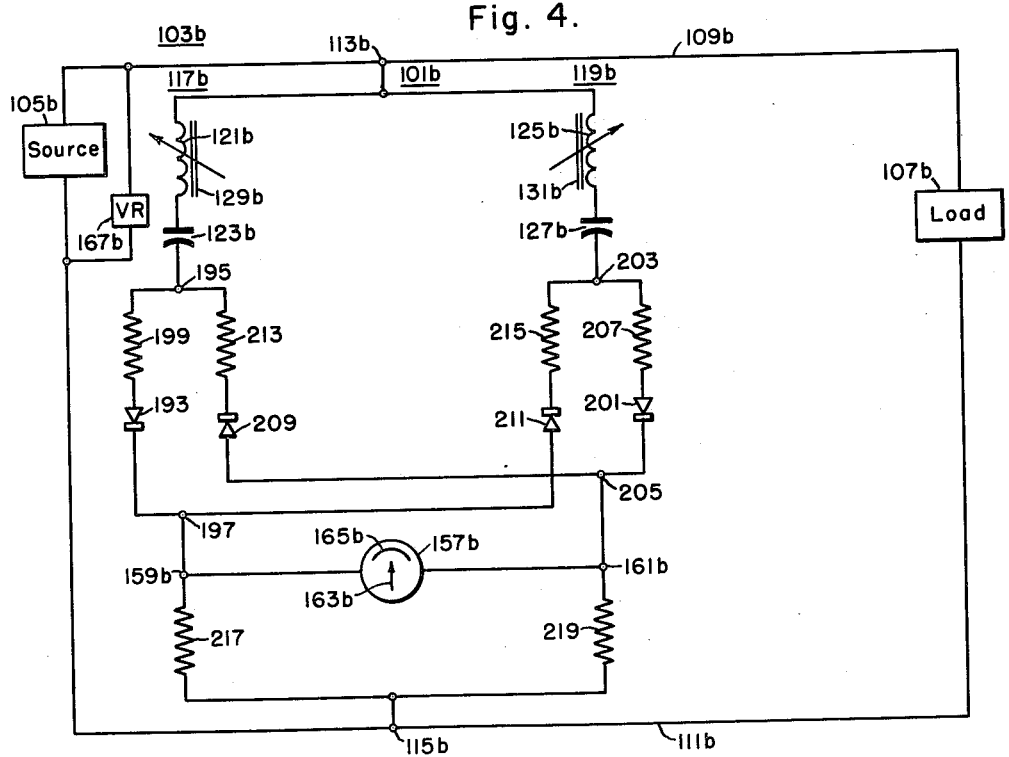

Other objects of the invention will be apparent from the following description taken in conjunction with the accompanying drawings, in which:

FIGURE 1 is a schematic representation of a device embodying the teachings of the invention for providing an indication of the phase relationship between two alternating quantities; and FIGS. 2, 3 and 4 are schematic representations of devices of different construction embodying the teachings of the invention for providing an indication of the frequency of an alternating quantity.

Referring to the drawings there is schematically illustrated in FIG. 1 a device represented generally by the numeral 1 constructed in accordance with the invention for providing an indication of the phase relationship between two alternating quantities. For purposes of illustration the device 1 is shown associated with a circuit 3 to provide an indication of the power factor of the circuit 3. As shown, the circuit 3 includes a pair of conductors 5 and 7 connecting a load 9 for energization from a source 11 of alternating voltage. The circuit 3 is assumed to be in the form of a single phase circuit operating at a frequency of 60 cycles per second.

The device 1 includes a plurality of energizable input terminals 13, 15 and 17. In order to permit an indication of the power factor of the circuit 3, the terminals 13 and 15 are shown connected respectively to the conductors 5 and 7 for energization in accordance with voltage of the circuit 3. The terminal 17 of the device 1 is connected for energization in accordance with current of the circuit 3. For this purpose the primary winding 19 of a transformer 21 is connected in the conductor 7 to cause the induction of an alternating voltage in the secondary winding 23 thereof which directs current through the terminal 17.

The device 1 includes a static network for deriving from voltage and current of the circuit 3, two direct voltage quantities whose difference is a function of the phase relationship between voltage and current of the circuit 3 or the power factor of the circuit 3. The network includes a pair of circuits 25 and 27 connected for parallel energization from the source 11 through the terminals 13 and 15 in accordance with voltage of the circuit 3 so that each of the circuits carries a separate alternating component representative of such voltage.

In order to establish a predetermined phase relationship between the alternating components in the circuits 25 and 27, suitable reactive impedance means are included in each of the circuits. For this purpose a condenser 29 is included in the circuit 25 and a reactor 31 is included in the circuit 27. The impedance means 29 and 31 are preferably proportioned to provide substantially equal leading and lagging phase displacements of the alternating components relative to the voltage of the circuit 3. With the arrangement shown, the component in circuit 25 will lead the voltage of circuit 3 by approximately 90° whereas the component in circuit 27 will lag the voltage of the circuit 3 by approximately 90°. The impedance means 29 and 31 are further selected to present substantially equal impedances to the components in the circuits 25 and 27 for the frequency of operation of the circuit 3.

Suitable rectifier means are included in each of the circuits 25 and 27 for the purpose of deriving a pair of direct current quantities from the associated alternating components. As shown in FIG. 1, half-wave rectifier elements 33 and 35 are included respectively in the circuits 25 and 27. The rectifiers 33 and 35 are connected in series with the impedance means 29 and 31 respectively by conductors 37 and 39 to have like polarities relative to each other.

In order to provide a pair of direct voltage quantities from the current quantities produced by the rectifiers 33 and 35, separate resistance means is included in each of the circuits 25 and 27 in the path of the associated current quantities. As shown, resistances 41 and 43 are connected respectively in series with the rectifiers 33 and 35 by conductors 45 and 47 to produce when energized direct voltage quantities. The resistances 41 and 43 are preferably selected to have substantially equal values of resistance. Any suitable material, such as carbon may be employed for the resistances 41 and 43.

The static network of the device 1 further includes means for deriving a pair of direct current quantities from current of the circuit 3. To this end a half-wave rectifier element 49 is connected for series energization from the secondary winding 23 of the transformer 21 through the terminal 17 by a conductor 51. A pair of branch circuits 53 and 55 are connected for parallel energization from the rectifier 49 through a conductor 57 so that each of the branch circuits carries a separate half-wave rectified current quantity representative of the current of the circuit 3. Resistances 59 and 61 of substantially equal values are included in the branch circuits 53 and 55 to limit the magnitudes of the associated current components.

In order to provide two resultant direct voltage quantities whose difference is a function of the phase relationship between voltage and current of the circuit 3, each of the resistances 41 and 43 is connected for energization from a separate one of the branch circuits 53 and 55. To this end the branch circuits 53 and 55 are connected respectively to the conductors 45 and 47 of the circuits 25 and 27 through conductors 63 and 65 at points 67 and 69. The point 67 is intermediate the rectifier 33 and the resistance 41 whereas the point 69 is intermediate the rectifier 35 and the resistance 43. With such arrangement the resistances 41 and 43 are each connected for energization by two direct current quantities which are representative of current and voltage of the circuit 3 to establish a pair of resultant direct voltage quantities. It has been observed that the difference in magnitudes between these resultant voltage quantities is a function of the power factor of the circuit 3.

In order to provide a return path for the current components traversing the circuits 25 and 27 on alternate half-cycles of the voltage of the circuit 3, a pair of shunt circuits 71 and 73 are connected to shunt the rectifiers 33 and 35 respectively. The shunt circuit 71 includes a current limiting resistance 75 and a rectifier 77 connected in series with the resistance 75 by a conductor 79. In a similar manner the circuit 73 includes a resistance 81 and a rectifier 83 connected in series with the resistance 81 by a conductor 85. The rectifiers 33 and 77 are connected to have opposite polarities relative to each other. The rectifiers 35 and 83 are similarly connected to have opposite polarities relative to each other. With such arrangement current flows from the terminal 13 through the resistances 41 and 43 on alternate half-cycles of the voltage of the circuit 3 and from the terminal 15 through the shunt circuits 71 and 73 on succeeding alternate half-cycles of such voltage.

In order to produce a response representative of power factor of the circuit 3, a suitable translating device 87 having input terminals 89 and 91 is connected between the circuits 25 and 27 for differential energization from the resultant direct voltage quantities produced across rsistances 41 and 43. For this purpose the terminal 89 is connected to the circuit 25 at the point 67 through the conductor 63 and the terminal 91 is connected to the circuit 27 at the point 69 through the conductor 65. The device 87 may be in the form of either a recording or indicating direct current responsive instrument.

For purposes of illustration the device 87 is shown in the form of an indicating instrument having an indicating pointer 93 traversing a suitable scale 95 which is calibrated in terms of power factor. The device 87 may be of the type wherein the pointer 93 has a rest position at the physical center of the scale 95. With such arrangement the center of the scale 95 is calibrated to indicate unity power factor. The portion of the scale at one side of the center may be calibrated in terms of leading power factor whereas the portion of the scale at the other side of the center may be calibrated in terms of lagging power factor. The operation of the device 1 may now be described.

Let it be assumed that the voltage and current of the circuit 3 have an in-phase relationship such that the power factor of the circuit 3 is unity. Then for alternate half-cycles of voltage of the circuit 3 for which the terminal 13 has a positive polarity, current components will flow from the terminal 13 through the impedance means 29 and 31 of the circuits 25 and 27. These current components have phase displacements relative to voltage of the circuit 3 which are respectively approximately 90° leading and 90° lagging. The components are therefore displaced relative to each other approximately 180°. These components traverse the rectifiers 33 and 35 to produce a series of direct current pulses which energize the resistances 41 and 43 to establish a series of direct voltage pulses having positive polarities at the points 67 and 69. By reason of the impedance means 29 and 31 the voltage pulses across resistance 41 are displaced in phase by approximately 180° with respect to the voltage pulses developed across the resistance 43.

For the same alternate half-cycles of voltage of the circuit 3 a series of direct current pulses flow through the branch circuits 53 and 55 which are representative of current of the circuit 3. The current pulses of the circuit 53 flow through the conductor 63 and the resistance 41 to establish across the resistance 41 a series of direct voltage pulses of positive polarity at the point 67. At the same time the current pulses of the circuit 55 traverse the conductor 65 and the resistance 43 to produce across the resistance 43 a series of direct voltage pulses of positive polarity at the point 69.

The voltage pulses derived from current of the circuit 3 have an in-phase relationship with respect to each other. However, the voltage pulses across the resistance 41 derived from the circuit 53 are displaced in phase relative to the voltage pulses developed across the resistance 41 from the circuit 25 so as to lag the voltage pulses from the circuit 25 by approximately 90°. Also, the voltage pulses across the resistance 43 derived from the circuit 55 are displaced in phase relative to the voltage pulses across the resistance 43 from the circuit 27 so as to lead the voltage pulses derived from the circuit 27 by approximately 90°. Consequently, the resultant voltage quantities across the resistances 41 and 43 have positive polarities at the points 67 and 69 and have substantially equal magnitudes with the result that the points 67 and 69 are at the same potential. Consequently, zero current flows through the device 87 with the result that the pointer 93 remains at the rest position to indicate unity power factor.

Let it be assumed now that voltage and current of the circuit 3 are displaced in phase so that the current lags the voltage by a certain phase angle. Then for this condition the voltage pulses across the resistance 41 derived from the circuit 25 are still displaced in phase by approximately 180° relative to the voltage pulses across the resistance 43 derived from the circuit 27. However, the voltage pulses across the resistance 41 derived from the circuit 53 are now shifted in phase with respect to the voltage pulses across the resistance 41 derived from the circuit 25 so as to provide a greater phase displacement therebetween than the displacement therebetween for the previously described condition of unity power factor. This results in a smaller resultant voltage quantity across the resistance 41 than the resultant voltage quantity thereacross for the previous condition.

For the presently assumed condition the voltage pulses across the resistance 43 derived from the circuit 55 are shifted in phase relative to the voltage pulses across the resistance 43 from the circuit 27 so as to provide a smaller displacement therebetween than the displacement therebetween for the previous condition of unity power factor. This results in a greater resultant voltage quantity across the resistance 43 than the resultant quantity thereacross for the previous condition. Consequently, current flows from the point 69 through the device 87 to the point 67 to thereby deflect the pointer 93 from the rest position thereof to a position at one side of the scale center. Such side of the scale 95 may be calibrated to indicate a lagging power factor of the circuit 3 which is effective to cause deflection of the pointer 93 to such scale position.

It may be shown by a similar analysis that when current of the circuit 3 leads voltage of the circuit 3 by a certain phase angle, the resultant voltage quantity across the resistance 41 is greater than the resultant voltage quantity across the resistance 43 with the result that current flows from the point 67 through the device 87 to the point 69. Such current flow causes deflection of the pointer 93 from the rest position to a position at the opposite side of the scale center from the side thereof for the condition of lagging power factor. The amount of deflection of the pointer 93 is substantially proportional to the power factor of the circuit 3. Also, the direction of such deflection from the scale center is dependent upon whether current of the circuit 3 has a leading or lagging displacement with respect to voltage of the circuit 3. The voltage quantities appearing across the resistances 41 and 43 include alternating components. For this reason the device 87 should be selected so that the pointer 93 will not respond to such alternating quantities.

Since the device 87 is responsive to the difference between voltage quantities across the resistances 41 and 43, variations in the magnitudes of voltage and current of the circuit 3 are effective to cause variations in the deflection of the pointer 93. Inasmuch as power factor of the circuit 3 is substantially independent of the magnitudes of the voltage and current thereof, such variations in the magnitudes of the voltage and current result in incorrect indications of power factor of the circuit 3. For this reason it is desirable that the magnitudes of the voltage and current be maintained at substantially constant values. To this end suitable voltage and current regulators are associated with the circuit 3. A voltage regulator diagrammatically represented by the block 97 is connected between the conductors 5 and 7. A suitable current regulator diagrammatically represented by the block 99 is connected in the conductor 51.

Reference has previously been made to an indicating instrument 87 having a pointer 93 with a rest position at the physical center of the scale 95. In certain installations it may be desirable to employ an instrument having a pointer with a rest position at one side of the scale center. For example, an instrument may be utilized which has a scale calibrated in terms of power factor with markings of equal increments between .5 lagging and .8 leading spaced uniformly over the scale. With such a scale distribution the unity power factor marking would be at one side of the physical center of the scale. The instrument may be provided with a pointer having a rest position at which the pointer indicates unity power factor.

Referring to FIG. 2, there is schematically illustrated a device represented generally by the numeral 101 for measuring the frequency of an alternating quantity. For purposes of illustration the device 101 is shown in association with a circuit 103 to measure the frequency of the voltage of a source 105 which is connected to supply a load 107 through conductors 109 and 111. The circuit 103 is assumed to be in the form of a single phase circuit operating at a frequency of 60 cycles per second.

The device 101 has input terminals 113 and 115 which are energizable by the alternating quantity whose frequency is to be determined. In order to permit an indication of the frequency of voltage of the source 105, the terminals 113 and 115 are shown connected respectively to the conductors 109 and 111 to permit energization of the device 101 in accordance with voltage of the source 105. The device 101 includes a static network for deriving from voltage of the circuit 103 two direct voltage quantities whose difference is a function of the frequency of the energizing voltage. The network includes a pair of circuits 117 and 119 connected for parallel energization through the terminals 113 and 115 from the source 105 so that each of the circuits 117 and 119 carries a separate alternating component representative of voltage of the circuit 103.

In order to provide two alternating components having magnitudes which vary in response to variations in the frequency of voltage of the circuit 103, separate reactive impedance means are included in each of the circuits 117 and 119. The impedance means are proportioned such that for a change in frequency of the voltage of the circuit 103 from the normal value thereof, the magnitudes of the alternating components vary in opposite directions relative to each other. For this purpose, a reactor 121 and a condenser 123 are series connected in the circuit 117 to provide a resonant condition of the circuit 117 for a frequency which is less than the normal frequency of voltage of the circuit 103. The circuit 119 includes a reactor 125 and a condenser 127 connected in series to provide a resonant condition of the circuit 119 for a frequency greater than the normal frequency. The reactors 121 and 125 are preferably of the iron core type having respectively cores 129 and 131 and are made adjustable to permit adjustment of the frequencies for which the associated circuits are in resonance. The resonant frequencies of the circuits 117 and 119 are preferably selected to differ from the normal frequency by substantially equal amounts.

In order to provide rectified current quantities from the alternating components of the circuits 117 and 119, half-wave rectifier elements 133 and 135 are connected respectively in the circuits 117 and 119 in series with the associated impedance means 121, 123, 125 and 127. As illustrated, the rectifiers 133 and 135 are connected to have like polarities relative to each other. A pair of resistances 137 and 139 are connected respectively in the circuits 117 and 119 for energization from the rectifiers 133 and 135 to establish a pair of rectified voltage quantities. The resistances 137 and 139 preferably are selected to have substantially equal values of resistance. The resistances 137 and 139 may be formed of any suitable material such as carbon.

In order to provide return paths for current components of the circuits 117 and 119 for alternate half-cycles of the voltage of circuit 103, a pair of shunt circuits 145 and 147 are connected to shunt the rectifiers 133 and 135 respectively. The circuit 145 includes a current limiting resistance 149 and a rectifier 151 in series and the circuit 147 similarly includes a resistor 153 and a rectifier 155 in series. The rectifiers 133 and 151 are connected to have opposite polarities relative to each other. The rectifiers 135 and 155 are similarly connected to have opposite polarities with respect to each other. This arrangement permits current flow from the terminal 113 through the resistances 137 and 139 for alternating half-cycles of voltage of the circuit 103 and from the terminal 115 through the shunt circuits 145 and 147 on succeeding alternate half-cycles of such voltage.

In order to produce a response representative of frequency of the voltage of the circuit 103, a suitable translating device 157 having input terminals 159 and 161 is connected between the circuits 117 and 119 for differential energization from the voltage quantities across the resistances 137 and 139. For this purpose the terminal 159 is connected to the conductor 141 and the terminal 161 is connected to the conductor 143. The device 157 may be a direct current responsive instrument of either the indicating or recording type. For purposes of illustration the device 157 is shown in the form of an indicating device having a pointer 163 cooperating with a scale 165 calibrated in terms of frequency. The device 157 may be of the type wherein the pointer 163 has a rest position at the physical center of the scale 165. With such arrangement the center of the scale 165 is calibrated to indicate the normal frequency of voltage of the circuit 103. The operation of the device 101 will now be described.

Let it be assumed that the frequency of the voltage of circuit 103 is 60 cycles per second. Then the reactor 121 and condenser 123 are selected to provide a resonant condition of the circuit 117 at a frequency of approximately 53 cycles per second, whereas the reactor 125 and condenser 127 are selected to provide a resonant condition of the circuit 119 at a frequency of approximately 67 cycles per second. For these conditions, then, current in the circuit 117 has a maximum value for a frequency of 53 cycles which value decreases as the frequency is increased from 53 cycles. Current in the circuit 119 has a maximum value at a frequency of 67 cycles which value decreases as the frequency is decreased from 67 cycles. For a frequency of 60 cycles the magnitudes of the current components may be made equal by slight adjustment of either of the reactors 121 and 125. Inasmuch as the resistances 137 and 139 are substantially equal, the voltage quantities developed thereacross are also substantially equal and have positive polarities at the terminals 159 and 161. This results in zero current flow through the device 157 so that the pointer 163 is at the rest position thereof at the center of the scale 165 to indicate a frequency of 60 cycles.

Let it be assumed now that the frequency of voltage of the circuit 103 is increased from 60 cycles to a value less than 67 cycles. For such condition the value of the current component in the circuit 117 decreases from the value thereof for the condition of 60 cycles whereas the value of the component in the circuit 119 increases from the value thereof for the condition of 60 cycles. This results in a decrease of the voltage quantity across the resistance 137 and an increase of the voltage quantity across the resistance 139. Consequently, current flows from the terminal 161 through the device 157 to the terminal 159 with the result that the pointer 163 is deflected from the rest position thereof to a position at one side of the scale center. The scale 165 may be calibrated at the deflected position of the pointer to indicate a value of frequency effective to cause such deflection.

It may be shown by similar analysis that for a decrease of frequency from 60 cycles to a value greater than 53 cycles, the voltage quantity developed across resistance 137 is greater than the voltage quantity developed across resistance 139. Consequently for this condition current flows from the terminal 159 through the device 157 to the terminal 161 to deflect the pointer 163 from the rest position to a position at the other side of the scale center from the side to which the pointer is deflected for the previous condition. Inasmuch as the device 157 is responsive to a difference in a pair of voltage quantities, a suitable voltage regulator diagrammatically represented by the block 167 is associated with the circuit 103 to maintain voltage of the circuit substantially constant.

The voltage quantities appearing across the resistances 137 and 139 include alternating components. Consequently, the device 157 should be selected so that the pointer 163 will not respond to such alternating quantities.

In order to provide a substantially linear scale distribution of the device 157, the operating range of the device 101 should be confined to a frequency range over which the magnitudes of the current components in the circuits 117 and 119 have substantially linear variations. For frequency values close to the resonant frequencies for the circuits 117 and 119, the magnitudes of the associated components vary in a non-linear manner. It has been observed that for 115 volt, 60 cycle operation a substantially linear scale for the device 157 is obtained over a frequency range between 55 and 65 cycles when the several circuit components have the following values:

The reactor 121 _____ henries__ 47.5
The condenser 123 _____ mfd__ .15
The reactor 125 _____ henries__ 74
The condenser 127 _____ mfd__ .10
The resistances 137, 139, 149 and 153 ____ ohms__ 3000

Due to cost considerations, it is desirable that the values of the condensers 123 and 127 be as small as possible. Consequently, the reactors 121 and 125 are preferably proportioned to have large inductance values. To obtain such inductance values while maintaining the size of the reactors within reasonable limits, the cores 129 and 131 thereof should be formed to exhibit high permeabilities and low losses. Such construction further provides excellent sensitivity of the device 101. Although the device 101 has been described for 60 cycle operation, the device may be employed to indicate frequencies from 20 cycles to 1000 cycles by suitable selection of the various components of the device 101.

In FIG. 3 there is shown a different construction of the device of FIG. 2. The devices of FIGS. 2 and 3 have a number of similar components. Consequently, similar components of FIG. 3 are represented by the same reference numerals but with the suffix *a*. As shown, the device 101*a* is associated with a circuit 103*a* to measure the frequency of voltage of a source 105*a* connected to supply a load 107*a* through conductors 109*a* and 111*a*. The device 101*a* has input terminals 113*a* and 115*a* connected respectively to the conductors 109*a* and 111*a*.

The device 111a includes a static network having circuits 117a and 119a connected for parallel energization from the circuit 103a so that each of the circuits 117a and 119a carries a separate component representative of voltage of the circuit 103a. The circuit 117a includes a reactor 121a and a condenser 123a proportioned to provide a resonant condition of the circuit for a frequency below the normal frequency of the circuit 103a. The circuit 119a includes a reactor 125a and a condenser 127a proportioned to provide a resonant condition of the circuit 119a for a frequency above the normal frequency.

In order to provide a pair of full wave rectified current quantities, full wave rectifier bridges 169 and 171 are connected respectively in the circuits 117a and 119a. The bridge 169 has input terminals 173 and 175 connected in the circuit 117a for energization respectively from the terminals 113a and 115a. The bridge 169 further includes a positive output terminal 177 and a negative output terminal 179. In a similar manner the bridge 171 has input terminals 181 and 183 connected in the circuit 119a for energization respectively from the terminals 113a and 115a. The bridge 171 also includes positive and negative output terminals 185 and 187 respectively.

In order to produce a response representative of frequency of voltage of the circuit 103a, a direct current instrument 157a, similar to the instrument 157 of FIG. 2, having terminals 159a and 161a is connected for differential energization from the direct current output quantities of the bridges 169 and 171. For this purpose the terminal 159a is connected to the terminal 179 of the bridge 169 and to the terminal 185 of the bridge 171 whereas the terminal 161a is connected to the terminal 177 of the bridge 169 and to the terminal 187 of the bridge 171. Current limiting resistances 189 and 191 of substantially equal value are provided as shown. The operation of the device 101a is similar to that of the device 101 of FIG. 2 with the exception of the provision of a pair of full wave rectifier bridges connected to energize the device 157a rather than the half-wave rectifiers employed in FIG. 2 to energize the device 157.

For alternate half-cycles of voltage of circuit 103a for which the terminal 113a has a positive polarity, current flows from the terminal 113a through the reactor 121a, the condenser 123a, the terminals 173, 177 and 161a, the device 157a, the terminals 159a, 179 and 175 to the terminal 115a. On succeeding half-cycles for which the terminal 115a is at a positive polarity, current flows from the terminal 115a through the terminals 175, 177, 161a, 159a, 179 and 173, the condenser 123a and the reactor 121a to the terminal 113a. Consequently, a full-wave rectified current flows from the bridge 169 through the terminal 161a and the instrument 157a to the terminal 159a. It may be shown in a similar manner that a full-wave rectifier current flows from the bridge 171 through the terminal 159a and the instrument 157a to the terminal 161a. This results in energization of the device 157a in accordance with the difference between the currents of the bridges 169 and 171. The pointer 163a is deflected in accordance with frequency of voltage of the circuit 103a in the manner described in connection with FIG. 2.

For a frequency of 60 cycles the full-wave rectified current from the bridges 169 and 171 are substantially equal in magnitude with the result that the pointer 163a remains at the rest position thereof to indicate a frequency of 60 cycles. If the frequency is increased from 60 cyles, the rectified current from the bridge 169 is decreased from the value thereof at 60 cycles and the rectified current from the bridge 171 is increased from the value thereof at 60 cycles. This results in current flow from the terminal 159a to the terminal 161a to deflect the pointer 163a to one side of the scale center. If the frequency is decreased from a value of 60 cycles, current from the bridge 169 is greater than current from the bridge 171 to produce a resultant current flow from the terminal 161a to the terminal 159a effective to deflect the pointer 163a to the opposite side of the scale center from the side to which the pointer is deflected for the previous condition.

In FIG. 4 there is shown a device 101b of different construction than the devices of FIGS. 2 and 3. Components of FIG. 4 similar to components of FIGS. 2 and 3 are represented by the same reference numerals with the suffix b.

As shown in FIG. 4, the device 101b is associated with a circuit 103b to provide an indication of the frequency of voltage of a source 105b connected to energize a load 107b through conductors 109b and 111b. The device 101b includes terminals 113b and 115b connected respectively to conductors 109b and 111b for energization in accordance with voltage of the circuit 103b. The device 101b includes a static network having a pair of circuits 117b and 119b connected for parallel energization from the circuit 103b so that each of the circuits 117b and 119b carries a separate current component representative of voltage of the circuit 103b. A reactor 121b and a condenser 123b are included in the circuit 117b to provide a resonant condition of the circuit 117b for a frequency below the normal frequency of the circuit 103b. A reactor 125b and a condenser 127b are connected in series in the circuit 119b to provide a resonant condition of the circuit 119b for a frequency which is above the normal frequency of the circuit 103b.

The static network further includes a rectifier 193 connected in the circuit 117b between the points 195 and 197 in series with the reactor 121b and condenser 123b. A resistance 199 is connected in series with the rectifier 193. In a similar manner a rectifier 201 is connected in the circuit 119b between the points 203 and 205 in series with the reactor 125b, the condenser 127b and a resistance 207. Also included in the network are a pair of rectifiers 209 and 211 cross-connected between the circuits 117b and 119b. The rectifier 209 is connected between the circuits 117b and 119b at the points 195 and 205 in series with a resistance 213. The rectifier 211 is connected between the circuits 117b and 119b at points 197 and 203 in series with a resistance 215. Resistances 217 and 219 of substantially equal value are connected respectively in series with the rectifiers 193 and 201 between the terminal 115b and the points 197 and 205. The resistances 217 and 219 may be formed of any suitable material such as carbon.

In order to produce a response representative of frequency of voltage of the circuit 103b, a direct current instrument 157b, similar to the instrument 157 of FIG. 2, having terminals 159b and 161b is connected for differential energization from the voltage quantities appearing across the resistances 217 and 219. To this end the terminal 159b is connected to the circuit 117b between the rectifier 193 and the resistance 217. The terminal 161b is connected to the circuit 119b between the rectifier 201 and the resistance 219. The operation of the device 101b may now be described according to the present understanding of the invention.

Let it be assumed that the circuit 103b is operating at a frequency of 60 cycles per second. For alternate half-cycles of voltage of the circuit 103b for which the terminal 113b is at a positive polarity, a first current flows from the terminal 113b through the reactor 121b, the condenser 123b, the rectifier 193, the point 197, the resistance 217 and to the terminal 115b. Some current will also flow from the point 197 through the rectifier 211, the resistance 215, the resistance 207, the rectifier 201 and the resistance 219 to the terminal 115b. At the same time, a second current flows from the terminal 113b through the reactor 125b, the condenser 127b, the rectifier 201 and the resistance 219 to the terminal 115b. Some current will also flow from the point 205 through the rectifier 209, the resistance 213, the resistance 199, the rectifier 193 and the resistance 217 to the terminal 115b. The first and second currents effect the establishment of voltage quantities across the resistances 217 and 219 having positive polarities at the terminals 159b and 161b.

For alternate half-cycles of voltage of the circuit 103b for which the terminal 115b is at a positive polarity, the first current flows from the terminal 115b through the resistance 219, the terminal 205, the rectifier 209, the condenser 123b and the reactor 121b to the terminal 113b. At the same time, the second current flows from the terminal 115b through the resistance 217, the terminal 197, the rectifier 211, the condenser 127b and the reactor 125b to the terminal 113b. This current flow results in the establishment of voltages across the resistances 217 and 219 having negative polarities at the terminals 159b and 161b. Hence, for a series of complete cycles of voltage of the circuit 103b, alternating voltage quantities appear at the terminals 159b and 161b. Since for a frequency of 60 cycles per second the first and second currents in the circuits 117b and 119b are substantially equal, zero average voltage appears between the terminals 159b and 161b. Consequently, zero current flows through the device 157b with the result that the pointer 163b remains at a rest position to indicate a frequency of 60 cycles per second.

Let it be assumed now that the frequency of the circuit 103b decreases to a value less than 60 cycles per second. Then the value of the first current in the circuit 117b increases from the value thereof at 60 cycles and the value of the second current in the circuit 119b decreases from the value thereof at 60 cycles. For alternate half-cycles of voltage of the circuit 103b for which the terminal 113b is at a positive polarity, the first and second currents establish voltage quantities across the resistances 217 and 219 having positive polarities at the terminals 159b and 161b. Inasmuch as the voltage quantity across the resistance 217 is greater than that across the resistance 219, the terminal 159b is more positive than the terminal 161b, with the result that current flows from the terminal 159b through the device 157b to the terminal 161b to deflect the pointer 163b to one side of the scale center.

For alternate half-cycles for which the terminal 115b is at a positive polarity, the first and second currents traverse respectively the resistances 219 and 217 to produce voltage quantities having negative polarities at the terminals 159b and 161b. The voltage quantity established by the first current is greater than the quantity established by the second current with the result that the terminal 161b is more negative and consequently less positive than the terminal 159b. Consequently, for the assumed condition, full-wave rectified voltage quantities appear at the terminals 159b and 161b with the result that current flows from the terminal 159b to the terminal 161b to deflect the pointer 163b to a position at one side of the scale center.

It may be shown by a similar analysis that for a frequency greater than 60 cycles per second, full-wave rectified voltage quantities appear at the terminals 159b and 161b such that the terminal 161b is more positive than the terminal 159b. This results in current flow from the terminal 161b to the terminal 159b which deflects the pointer 163b to the side of the scale center opposite to the side thereof to which the pointer is deflected for the previous condition.

In the devices of FIGS. 2, 3 and 4 the associated direct current instruments have been described as including a pointer with a rest position at the physical center of the scale. For certain purposes, it may be desirable to employ an instrument having a pointer with a rest position at one side of the scale center.

As an example, let it be assumed that the device 101 of FIG. 2 includes an instrument 157 having a scale 165 calibrated in terms of frequency with markings of equal increments between 58 and 62 cycles per second spaced uniformly over the scale. With such a scale distribution the 60 cycle marking would be at the physical center of the scale with the 61 cycle marking at one side of the center of the scale. The instrument 157 may be provided with a pointer having a rest position at which the pointer indicates 61 cycles. For this purpose the circuits 117 and 119 would be proportioned to cause zero current flow through the instrument 157 for a frequency of 61 cycles per second.

Such an arrangement would be advantageous in installations wherein it is desired to detect deviations from a normal frequency such as 60 cycles per second. In the event that the device 101 became accidently deenergized the pointer would assume its rest position to inidicate a frequency of 61 cycles per second so long as the device 101 remained in a deenergized state. Such continued indication of a deviation from the normal frequency would suggest to an operator that the device was in a deenergized state. It is apparent that if the instrument pointer had a rest position at which it indicated the normal frequency of 60 cycles, a deenergized condition of the device 101 could not be as readily detected.

The operation of the device 101b may be affected by temperature changes. It has been observed that an increase in temperature tends to reduce the magnitude of the resultant current flowing from the circuits 117b and 119b through the device 157b. This effect is compensated for by replacing portions of the carbon resistances 217 and 219 with a material such as copper which has a positive temperature coefficient of resistance. Such compensation may also be provided for the devices of FIGS. 1, 2 and 3.

By means of the invention a conventional direct current indicating or recording instrument may be employed in connection with a static network to provide an indication of frequency of an alternating quantity energizing the network. Frequencies within a very narrow range such as between 59 and 61 cycles may be measured quite accurately. If a direct current instrument of the indicating type is employed, such instrument may be provided with substantially uniform scale distribution. The invention further eliminates the necessity of manufacturing and stocking of alternating current responsive movement which are designed for use only as frequency measuring devices.

Although the invention has been described with reference to certain specific embodiments thereof, numerous modifications are possible, and it is desired to cover all modifications falling within the spirit and scope of the invention.

I claim as my invention:

1. In a device for measuring the frequency of an alternating quantity, a pair of main circuits each arranged to carry a separate component of said alternating quantity, each of said main circuits including impedance means having an impedance dependent upon the frequency of an alternating quantity, each of said main circuits including a pair of parallel branch circuits connected in series relation with its said impedance means, a separate half-wave rectifier included in each of said branch circuits, said rectifiers being, respectively, oppositely poled relative to each other in said parallel branch circuits, and a separate resistance element included in each of said branch circuits in series with the associated rectifier and separated from its respective said impedance means by its respective said rectifier; said impedance means being proportioned to provide a pair of differently tuned resonant main circuits, and a translating device having a pair of spaced terminals, one of said spaced terminals being connected to a point intermediate the rectifier and resistance element of a first branch circuit of one of said pairs of branch circuits, the other of said spaced terminals being connected to a point intermediate the rectifier and resistance element of a first branch circuit of the other of said pairs of branch circuits, said translating device being effective to produce a response representative of the frequency of said alternating quantity, the rectifiers associated with said first branch circuits having like relative polarization.

2. In a device for measuring the frequency of an alternating quantity; a pair of circuits each arranged to carry a separate component of said alternating quantity; each of said circuits including in series impedance means having an impedance dependent upon the frequency of an alternating quantity, a first half-wave rectifier connected to said impedance means, and a resistance element connected to said first rectifier and separated thereby from said impedance means; said impedance means being proportioned to provide a pair of differently tuned resonant circuits; a a second half-wave rectifier connected between said circuits from a first point intermediate the first rectifier and the resistance element of one circuit to a second point intermediate the impedance means and the first rectifier of the other circuit; a third half-wave rectifier connected between said circuits from a third point intermediate the first rectifier and the resistance element of said other circuit to a fourth point intermediate the impedance means and the first rectifier of said one circuit, said first, second and third rectifiers being poled relative to one another so that the component of said one circuit is periodically diverted to said other circuit, and the component of said other circuit is periodically diverted to said one circuit; and a translating device connected between said first and third points to produce a response representative of the potential difference between said first and third points which is representative of the frequency of the alternating quantity.

3. In a device for measuring the frequency of an alternating quantity; a pair of main circuits each arranged to carry a separate component of said alternating quantity; each of said main circuits including impedance means having an impedance dependent upon the frequency of an alternating quantity, a pair of parallel branch circuits connected in series relation with said impedance means, a separate half-wave rectifier included in each of said branch circuits, said rectifiers being oppositely poled relative to each other in said branch circuits, correspondingly poled ones of said rectifiers having first terminals connected to the respective said impedance means and having second terminals, and a separate resistance element included in each of said main circuits individually connected to said second terminal of the one of said rectifiers with which it is associated; said impedance means being proportioned to provide a pair of differently tuned resonant main circuits; and a translating device connected between said second terminals to produce a response representative of the frequency of said alternating quantity; said translating device comprising a direct current instrument having an indicating pointer for traversing a scale calibrated in terms of frequency.

4. In a device for measuring the frequency of an alternating quantity; a pair of circuits each arranged to carry a separate component of said alternating quantity; each of said circuits including in series impedance means having an impedance dependent upon the frequency of an alternating quantity, a first half-wave rectifier connected to said impedance means, and a resistance element connected to said first rectifier and separated thereby from said impedance means; said impedance means being proportioned to provide a pair of differently tuned resonant circuits; a second half-wave rectifier connected between said circuits from a first point intermediate the first rectifier and the resistance element of one circuit to a second point intermediate the impedance means and the first rectifier of the other circuit; a third half-wave rectifier connected between said circuits from a third point intermediate the first rectifier and the resistance element of said other circuit to a fourth point intermediate the impedance means and the first rectifier of said one circuit; said first, second and third rectifiers being poled relative to one another so that the component of said one circuit is periodically diverted to said other circuit, and the component of said other circuit is periodically diverted to said one circuit; and a translating device connected between said first and third terminals to produce a response representative of the frequency of the alternating quantity; said translating device comprising a direct current instrument having a member mounted for movement in accordance with energization of the instrument to provide a visual indication of such frequency.

References Cited in the file of this patent
UNITED STATES PATENTS

| | | |
|---|---|---|
| 1,601,070 | Horton | Sept. 28, 1926 |
| 1,874,899 | Chiriex | Aug. 30, 1932 |
| 2,209,064 | Nyquist | July 23, 1940 |
| 2,290,327 | Hansell | July 21, 1942 |
| 2,405,073 | Troell | July 30, 1946 |
| 2,424,131 | Warnick | July 15, 1947 |
| 2,445,800 | Mortlock | July 27, 1948 |
| 2,545,369 | Millar | Mar. 13, 1951 |
| 2,576,249 | Barney | Nov. 27, 1951 |
| 2,595,263 | Ingalls | May 6, 1952 |
| 2,759,109 | Swift | Aug. 15, 1956 |
| 2,774,038 | Stavis | Dec. 11, 1956 |
| 2,788,489 | Hollywood | Apr. 9, 1957 |
| 2,794,928 | Frank | June 4, 1957 |

FOREIGN PATENTS

| | | |
|---|---|---|
| 843,444 | Germany | July 7, 1952 |
| 871,031 | Germany | Mar. 19, 1953 |
| 690,292 | Great Britain | Apr. 15, 1953 |
| 712,527 | Great Britain | July 28, 1954 |
| 727,434 | Great Britain | Mar. 30, 1955 |